US007466482B2

(12) United States Patent
Liao

(10) Patent No.: US 7,466,482 B2
(45) Date of Patent: Dec. 16, 2008

(54) DISPLAY UNIT

(75) Inventor: Chen-Sung Liao, Taichung (TW)

(73) Assignee: Disk King Technology Co., Ltd. (TW)

( * ) Notice: Subject to any disclaimer, the term of this patent is extended or adjusted under 35 U.S.C. 154(b) by 542 days.

(21) Appl. No.: 11/318,842

(22) Filed: Dec. 27, 2005

(65) Prior Publication Data

US 2007/0144990 A1 Jun. 28, 2007

(51) Int. Cl.
*G03B 21/56* (2006.01)

(52) U.S. Cl. ........................ 359/443; 359/460; 348/840

(58) Field of Classification Search ................. 359/443, 359/460, 449; 348/839–840; 248/917

See application file for complete search history.

(56) References Cited

U.S. PATENT DOCUMENTS 4,718,549 A * 1/1988 Rissotti et al. .............. 206/711
4,889,244 A * 12/1989 Hehn et al. ................... 211/40
5,116,117 A * 5/1992 Miyashita .................... 353/94
5,249,005 A * 9/1993 Furuno ........................ 353/94
5,838,493 A * 11/1998 Furuya ....................... 359/443
6,028,701 A * 2/2000 Gulick et al. ............... 359/443
6,912,086 B2 * 6/2005 Honda ........................ 359/449
2007/0153138 A1 * 7/2007 Levy .......................... 348/825

* cited by examiner

*Primary Examiner*—Christopher Mahoney
(74) *Attorney, Agent, or Firm*—Ostrolenk, Faber, Gerb & Soffen, LLP

(57) ABSTRACT

A display unit includes a housing having a front end portion, upper and lower walls, and two opposite side walls, and formed with a rib that protrudes from one of the upper and lower walls and that extends between the side walls in a transverse direction relative to the side walls, and a retaining groove that is indented from the other of the upper and lower walls, and that extends between the side walls in the transverse direction. When two of the display units are stacked one above the other, the rib on one of the display units is fitted into the retaining groove in the other of the display units. A screen is mounted on the front end portion of the housing. An image projecting device is mounted in the housing for projecting images onto the screen.

5 Claims, 7 Drawing Sheets

DISPLAY UNIT

BACKGROUND OF THE INVENTION

1. Field of the Invention

The invention relates to a display unit, more particularly to a display unit with ribs and grooves so that a plurality of the display units can be assembled to form a large screen wall.

2. Description of the Related Art

FIG. 1 illustrates a support frame 1 including a plurality of horizontal rods 101 and a plurality of vertical rods 102 interconnecting the horizontal rods 101 so as to form a plurality of mounting spaces 103 for receiving display units (not shown), respectively, and so as to form the display units into a large screen.

However, the large screen thus formed is divided into cells separated by the horizontal rods 101 and the vertical rods 102, which results in undesired partitioning of the image shown on the large screen.

SUMMARY OF THE INVENTION

Therefore, the object of the present invention is to provide a display unit that can overcome the aforesaid drawback associated with the prior art.

Accordingly, a display unit of this invention comprises: a housing having a front end portion that defines a front opening, upper and lower walls, and two opposite side walls interconnecting the upper and lower walls, the housing being formed with a rib that protrudes from one of the upper and lower walls and that extends between the side walls in a transverse direction relative to the sidewalls, and a retaining groove that is indented from the other of the upper and lower walls, that extends between the side walls in the transverse direction, that is aligned with the rib in a normal direction relative to the upper and lower walls, and that has a size corresponding to that of the rib so that when the housings of two of the display units are stacked one above the other, the rib on one of the display units is fitted into the retaining groove in the other of the display units; a screen mounted on the front end portion of the housing for covering the front opening; and an image projecting device mounted in the housing for projecting images onto the screen.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
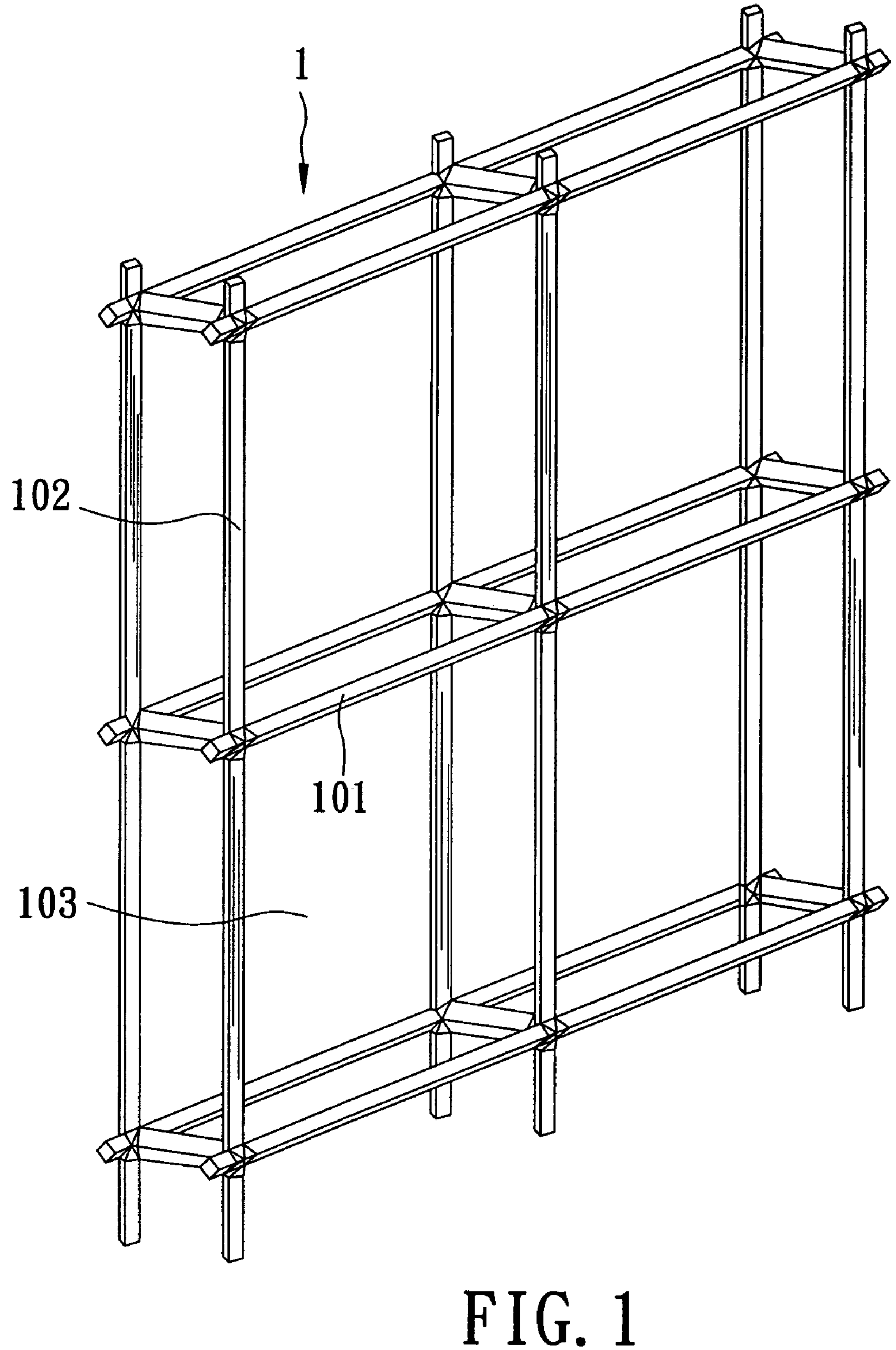
FIG. 1 PRIOR ART
FIG. 1 is a perspective view of a support frame adapted for supporting conventional display units.
Figure 2:
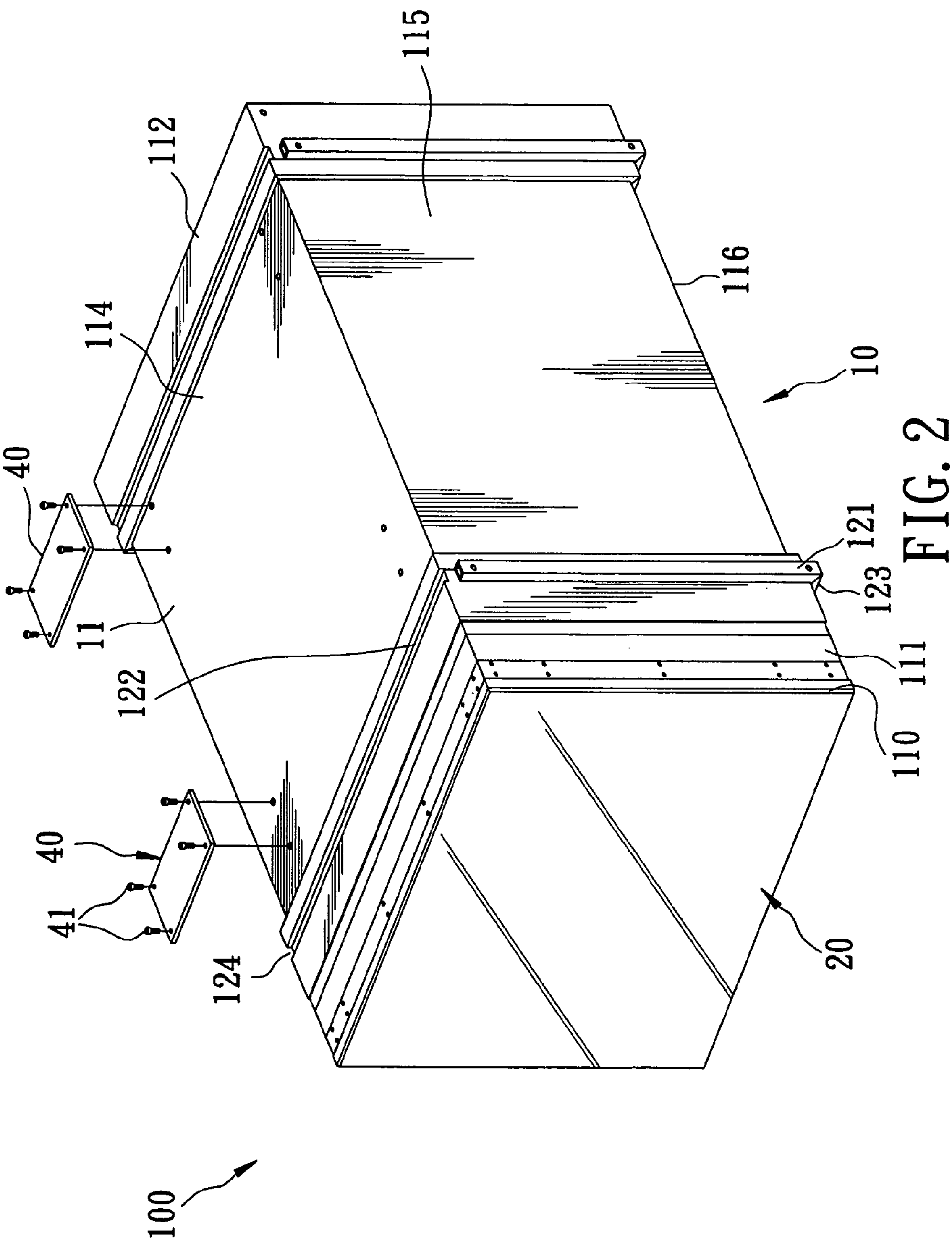
FIG. 2 is a partly exploded perspective view of the preferred embodiment of a display unit according to the present invention.
Figure 3:
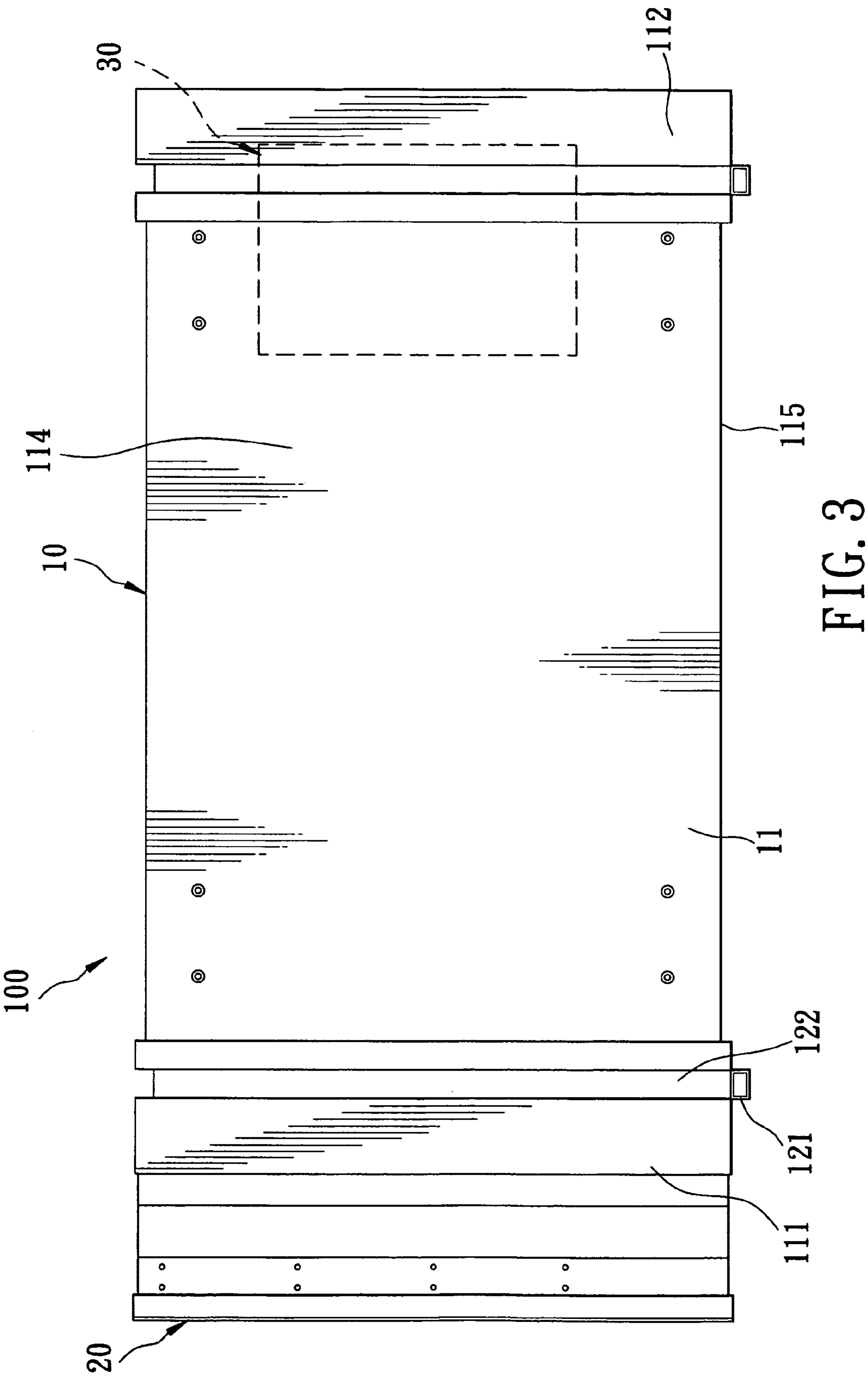
FIG. 3 is a schematic top view of the preferred embodiment.
Figure 4:
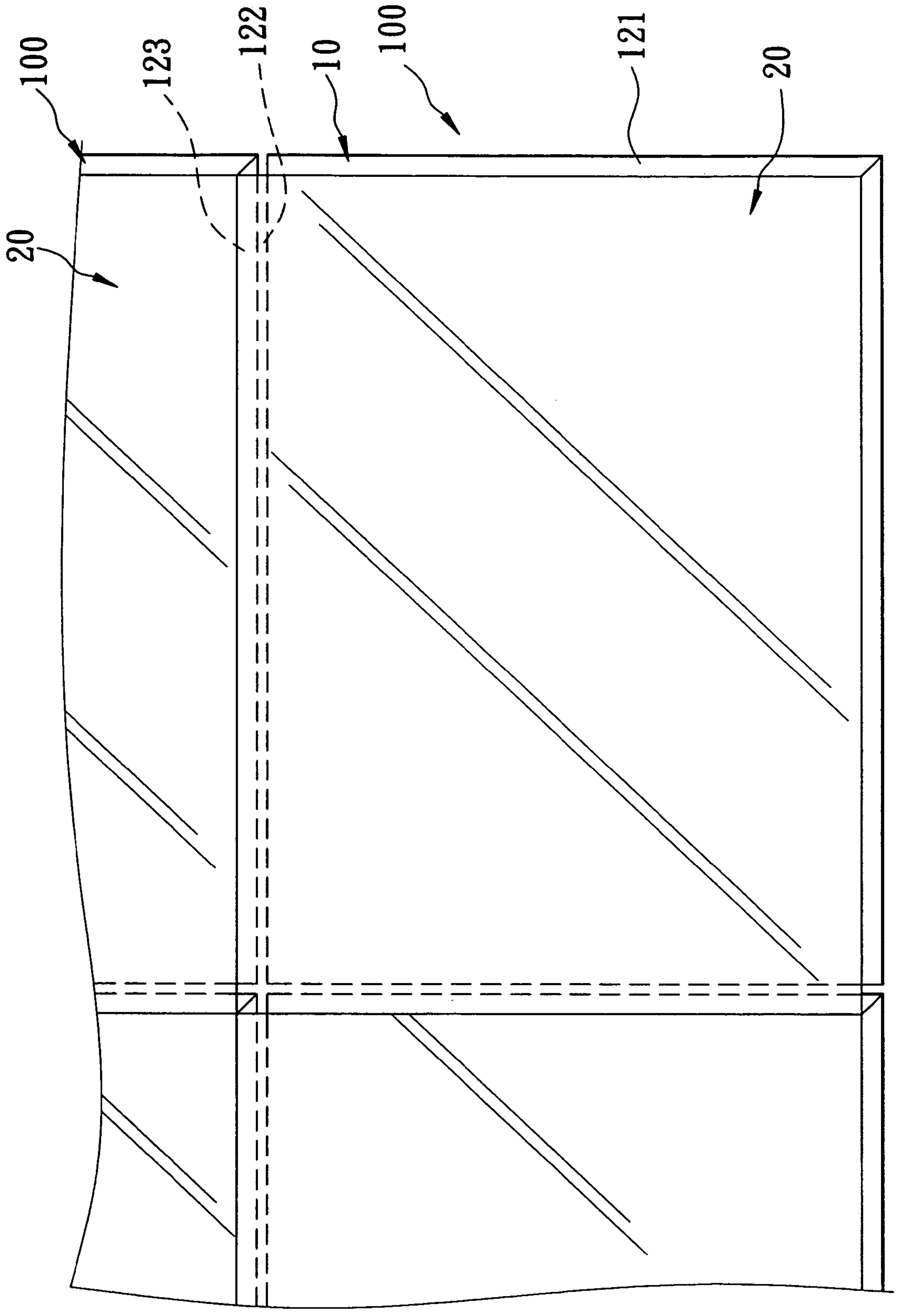
FIG. 4 is a fragmentary schematic front view to illustrate how a plurality of the display units of the preferred embodiment are stacked one above the other through engagement between a rib and a retaining groove provided on an adjacent pair of the display units.

Referring to FIGS. 2 and 3, the preferred embodiment of a display unit 100 according to the present invention is shown to comprise: a housing 10 having a front end portion 111 that defines a front opening 110, upper and lower walls 114,116, and two opposite side walls 115 interconnecting the upper and lower walls 114,116, the housing 10 being formed with a first rib 123 that protrudes from the lower wall 116 and that extends between the side walls 115 in a transverse direction relative to the side walls 115, and a first retaining groove 122 that is indented from the upper wall 114, that extends between the side walls 115 in the transverse direction, that is aligned with the first rib 123 in a normal direction relative to the upper and lower walls 114,116, and that has a size corresponding to that of the first rib 123 so that when the housings 10 of two of the display units 100 are stacked one above the other (see FIG. 4), the first rib 123 on one of the display units 100 is fitted into the first retaining groove 122 in the other of the display units 100; a screen 20 mounted on the front end portion 111 of the housing 10 for covering the front opening 110; and an image projecting device 30 mounted in the housing 10 for projecting images onto the screen 20.

Figure 5:
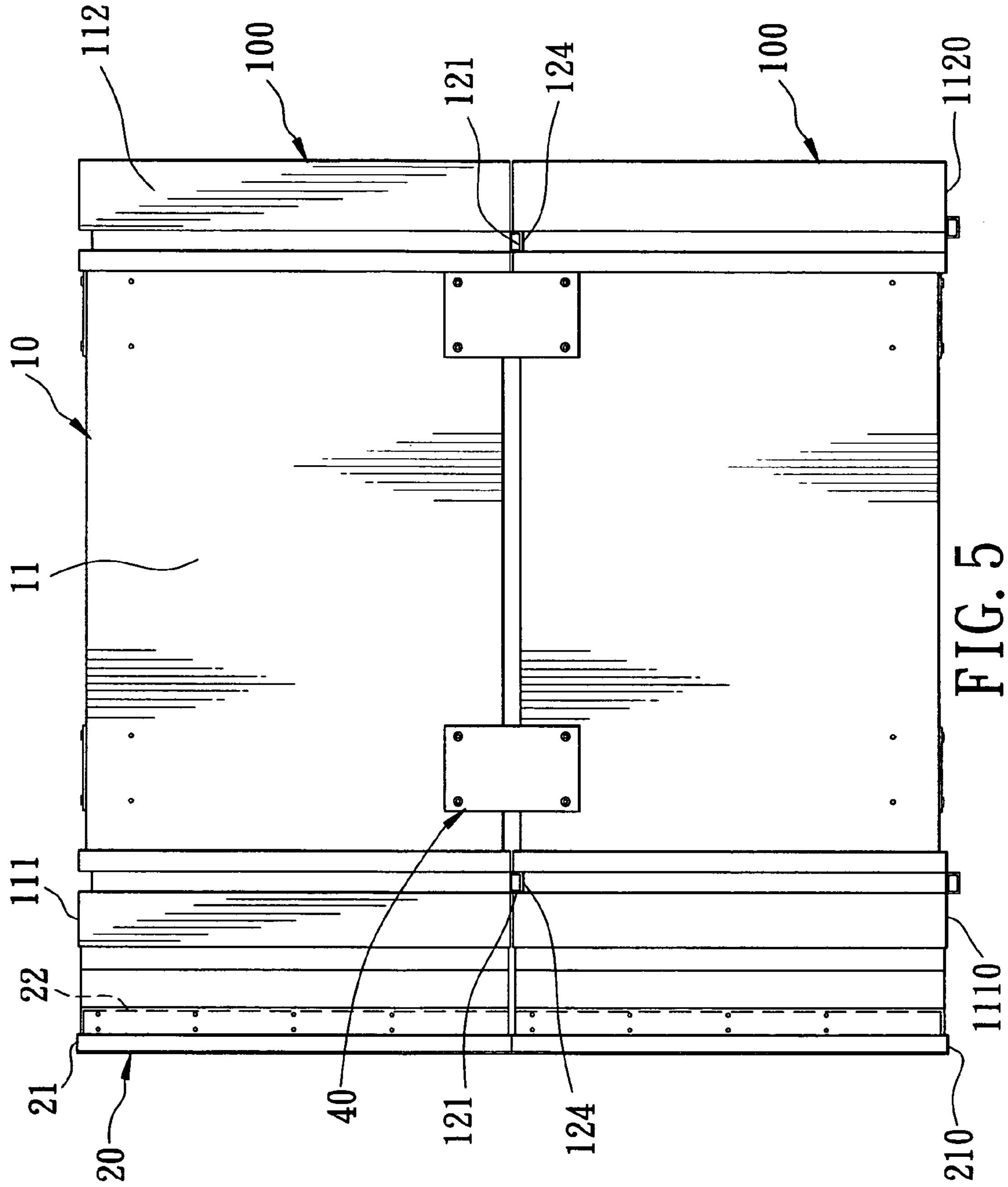
FIG. 5 is a schematic top view to illustrate how two of the display units of the preferred embodiment are juxtaposed and connected sidewisely to each other by engagement between a rib and a retaining groove and by a fastening plate.

Referring to FIG. 5, in combination with FIG. 2, the housing 10 is further formed with a second rib 121 that protrudes from one of the side walls 115 and that extends between the upper and lower walls 114,116 in the normal direction, and a second retaining groove 124 that is indented from the other of the side walls 115, that extends between the upper and lower walls 114,116 in the normal direction, that is aligned with the second rib 121 in the transverse direction, and that has a size corresponding to that of the second rib 121 so that when the housings 10 of two of the display units 100 are juxtaposed and connected sidewisely to each other, the second rib 121 on one of the display units 100 is fitted into the second retaining groove 124 in the other of the display units 100. In this embodiment, the first and second ribs 123, 121 are connected to each other and cooperate to form an L-shaped rib, and the first and second retaining grooves 122, 124 are connected to each other and cooperate to form an L-shaped retaining groove.

Figure 6:
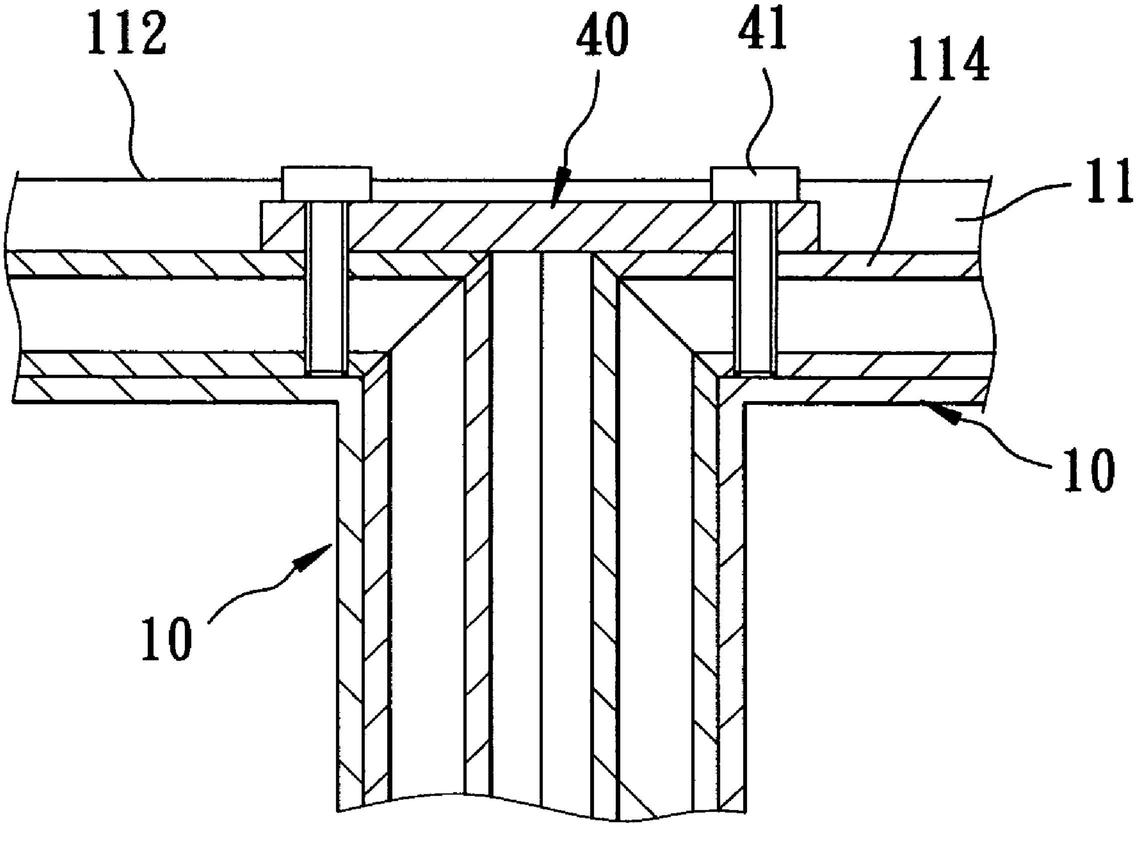
FIG. 6 is a fragmentary schematic sectional view to illustrate how two of the display units of the preferred embodiment are connected to each other through the fastening plate and screws.
Figure 7:
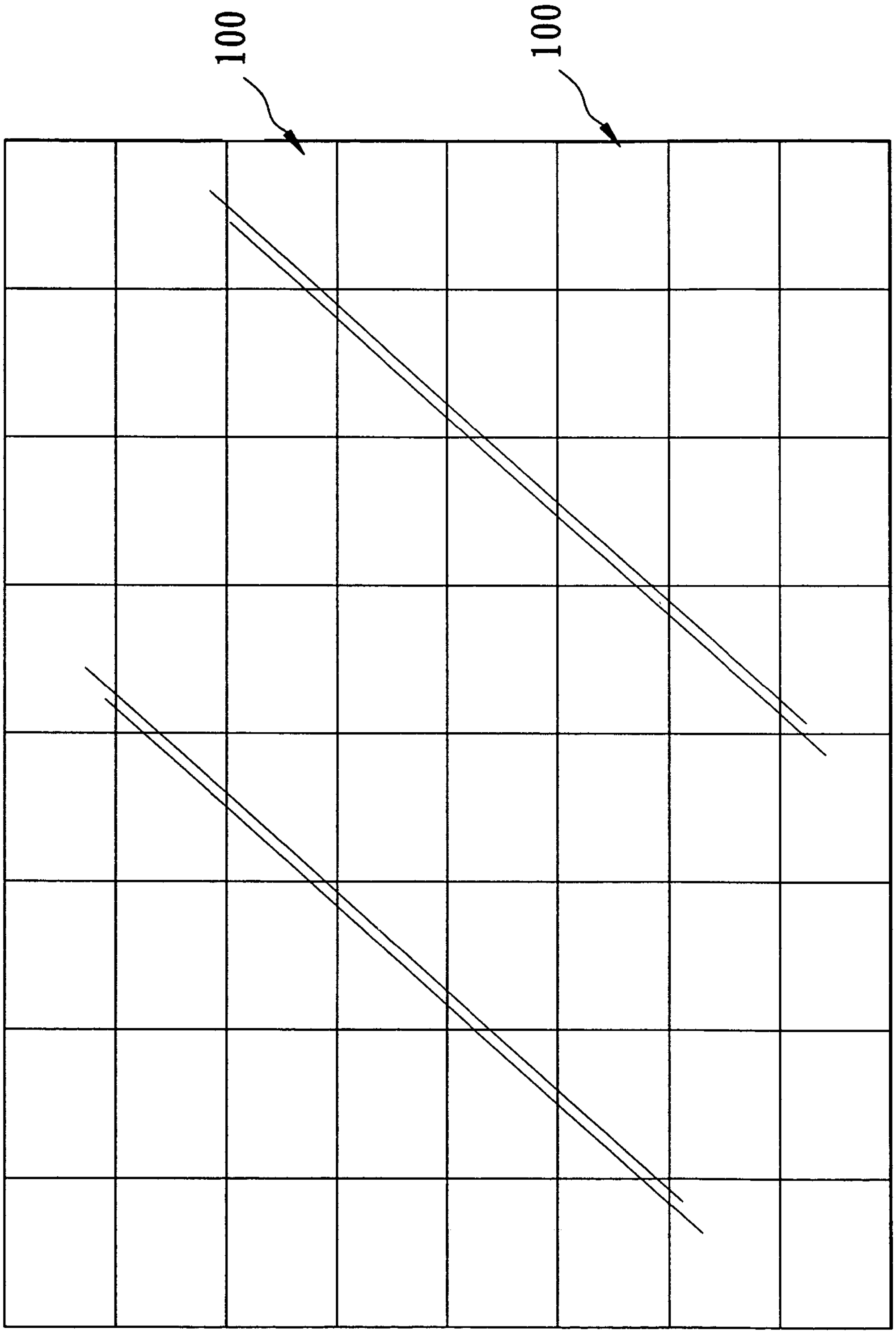
FIG. 7 is a schematic view to illustrate a large screen formed by assembling a plurality of the display units of the preferred embodiment.

The housing 10 further has a rear end portion 112 and an intermediate portion 113 extending between and reduced in cross-section from the front and rear end portions 111, 112 so as to form a recess 11 between the front and rear end portions 111, 112. The first retaining groove 122 is formed in the front end portion 111 at the upper wall 114. The display unit 100 further includes screws 41 and a fastening plate 40 that is secured to the upper wall 114 within the recess 11 through the screws 41 (see FIGS. 5 and 6), that has a level lower than those of the front and rear end portions 111, 112, and that extends sidewisely beyond an adjacent one of the side walls 115 so that when the housings 10 of two of the display units 100 are juxtaposed and connected sidewisely to each other, the fastening plate 40 can be secured to the upper walls 114 of the housings 10 of the display units 100 through the screws 41. In this manner, a number of the display units 100 can be assembled together to form a large screen wall, as best shown in FIG. 7.

Referring again to FIG. 5, each of the front and rear end portions 111, 112 of the housing 10 has a peripheral edge 1110 (1120). The screen 20 has a front portion 21 and a rear portion 22 reduced in cross-section from the front portion 21 and fitted into the front end portion 111 of the housing 10. The front portion 21 of the screen 20 is exposed from the housing 10, and has a peripheral edge 210 that is substantially flush with the peripheral edges 1110, 1120 of the front and rear end portions 111, 112 of the housing 10. In this manner, the screen wall thus formed, as best shown in FIG. 7, substantially has no clearance between two adjacent ones of the display units 100, thereby eliminating the aforesaid drawback associated with the prior art.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A display unit comprising:

a housing having a front end portion that defines a front opening, upper and lower walls, and two opposite side walls interconnecting said upper and lower walls, said housing being formed with a first rib that protrudes from one of said upper and lower walls and that extends between said side walls in a transverse direction relative to said side walls, and a first retaining groove that is indented from the other of said upper and lower walls, that extends between said side walls in the transverse direction, that is aligned with said first rib in a normal direction relative to said upper and lower walls, and that has a size corresponding to that of said first rib so that when said housings of two of said display units are stacked one above the other, said first rib on one of said display units is fitted into said first retaining groove in the other of said display units;

a screen mounted on said front end portion of said housing for covering said front opening; and an image projecting device mounted in said housing for projecting images onto said screen.

2. The display unit as claimed in claim 1, wherein said housing is further formed with a second rib that protrudes from one of said side walls and that extends between said upper and lower walls in the normal direction, and a second retaining groove that is indented from the other of said side walls, that extends between said upper and lower walls in the normal direction, that is aligned with said second rib in the transverse direction, and that has a size corresponding to that of said second rib so that when said housings of two of said display units are juxtaposed and connected sidewisely to each other, said second rib on one of said display units is fitted into said second retaining groove in the other of said display units.

3. The display unit as claimed in claim 2, wherein said first and second ribs are connected to each other and cooperate to form an L-shaped rib, said first and second retaining grooves being connected to each other and cooperating to form an L-shaped retaining groove.

4. The display unit as claimed in claim 3, wherein said housing further has a rear end portion and an intermediate portion extending between and reduced in cross-section from said front and rear end portions so as to form a recess between said front and rear end portions, said first retaining groove being formed in said front end portion at said upper wall, said display unit further comprising screws and a fastening plate that is secured to said upper wall within said recess through said screws, that has a level lower than those of said front and rear end portions, and that extends sidewisely beyond one of said side walls so that when said housings of two of said display units are juxtaposed and connected sidewisely to each other, said fastening plate can be secured to said upper walls of said housings of said display units through said screws.

5. The display unit as claimed in claim 4, wherein each of said front and rear end portions of said housing has a peripheral edge, said screen having a front portion and a rear portion reduced in cross-section from said front portion and fitted into said front end portion of said housing, said front portion of said screen being exposed from said housing and having a peripheral edge that is substantially flush with said peripheral edges of said front and rear end portions of said housing.

* * * * *